United States Patent [19]
Scheuerlein et al.

[11] 3,883,452
[45] May 13, 1975

[54] COMPOSITION OF POLYIMIDE POWDER AND POLYFORMALDEHYDE

[75] Inventors: Edwin Louis Scheuerlein; Frank Clyde Starr, Jr., both of Wilmington, Del.

[73] Assignee: E. I. du Pont de Nemours & Company, Wilmington, Del.

[22] Filed: May 15, 1973

[21] Appl. No.: 360,582

[52] U.S. Cl............ 260/2.5 M; 51/298; 260/2.5 N; 260/2.5 D; 260/33.6 UA; 260/33.6 R; 260/37 N; 260/857 PI; 260/857 F; 260/857 UN
[51] Int. Cl..................... C08g 53/08; C08j 1/14
[58] Field of Search.......... 252/12, 12.2, 12.4, 12.6; 260/2.5 M, 2.5 N, 857 PI; 857 OX

[56] References Cited
UNITED STATES PATENTS

| | | | |
|---|---|---|---|
| 3,179,631 | 4/1965 | Endrey | 260/78 TF |
| 3,249,588 | 5/1966 | Gall | 260/78 TF |
| 3,287,288 | 11/1966 | Reiling | 252/12 |
| 3,413,394 | 11/1968 | Jordan | 260/63 R |
| 3,613,202 | 10/1971 | Soder | 252/12.2 |

OTHER PUBLICATIONS

"Plastic Bearings" by Joseph C. Benedyk, SPE Journal, Volume 26, April 1970, pages 78–85.

Primary Examiner—Morton Foelak

[57] ABSTRACT

A composition of a coalescible polyimide powder and a polymer of formaldehyde is provided, said composition adapted for fabricating porous polyimide shaped articles by subjecting said composition to a forming pressure of about 100,000 psi to provide a preform, and thereafter sintering said preform by heating said preform to a temperature above about 300°C. to provide a porous polyimide shaped article having interconnecting pores; said porous polyimide shaped articles being useful as, for example, oil-impregnated bearings.

15 Claims, No Drawings

COMPOSITION OF POLYIMIDE POWDER AND POLYFORMALDEHYDE

FIELD OF THE INVENTION

The present invention relates to compositions of polyimide polymeric material and to a process for preparing porous polyimide structures from such compositions.

BACKGROUND OF THE INVENTION

Polyimides are known polymeric materials and are described in, for example, U.S. Pat. Nos. 3,179,631; 3,179,634 and 3,249,588. As described in the aforementioned patents, the polyimides are obtained by reacting specified tetracarboxylic acid dianhydrides with specified diprimary diamines to obtain intermediate polyamide-acids which may be converted by any one of several suitable methods, such as chemical or heat treatment, to the corresponding polyimide. Shaped structures may be prepared from coalescible polyimide powders by hot-forming or molding techniques as described in U.S. Pat. Nos. 3,179,631 and 3,249,588 or by direct-forming, free-sintering techniques described in U.S. Pat. No. 3,413,394. For instance, U.S. Pat. No. 3,179,631 describes finely-divided polyimide powders having a surface area of greater than 0.1 square meter per gram that are coalesced into solid homogeneous objects at pressures above 3000 psi and at temperatures in the range of 200°C. to 500°C. Heretofore, porous structures of coalesced polyimide resin powder have been provided, for example, by compacting a polyimide powder at a pressure level lower than the pressure utilized normally for preparing shaped polyimide structures by the direct-forming technique thereby to provide a preform which has sufficient structural integrity to be handled physically, and thereafter subjecting said preform to a heating sequence at temperatures above 400°C. in the absence of applied pressure thereby to sinter the preform and provide a molding or shaped structure having a density of less than 92% of the density of a normally, fully coalesced polyimide shaped structure prepared by hot-forming or molding techniques (Product Licensing Index, November, 1970). A significant disadvantage and drawback of the above-described process for preparing porous polyimide shaped structures is the inability to prepare structures having adequate pore structure as, for example, in sleeve or journal bearings. For example, porous sleeve bearings of polyimide polymeric material are fabricated by compacting a polyimide powder in a cored die assembly, and in the course of such manufacture, the sleeve bearing surfaces parallel to the pressing direction of the die assembly are subjected to high frictional forces along the walls of the die (including the die core rod) during the compaction and ejection sequence of the molding operation with the consequent result of providing sleeve bearings having substantially smooth surfaces and only few surface pores of generally smaller size than desired, i.e., inadequate pore structure; such sleeve bearings have inadequate oil capacity and oil flow (for lubrication purposes) because of the inadequate pore structure thereof. Accordingly, it is the principal object of the present invention to provide a composition of coalescible polyimide polymeric material and a process for preparing porous polyimide shaped structures from such compositions that overcome and obviate the above-described drawbacks and limitations.

THE INVENTION

According to the present invention, there is provided a composition comprising a coalescible polyimide powder and a solid particulate polymer of formaldehyde. The composition of the invention comprises preferably a coalescible polyimide powder and up to about 50% by weight, based upon the total composition weight, of a solid particulate polymer of formaldehyde. In a preferred embodiment, the composition of the invention comprises a coalescible polyimide powder, said polyimide having the following recurring structural unit:

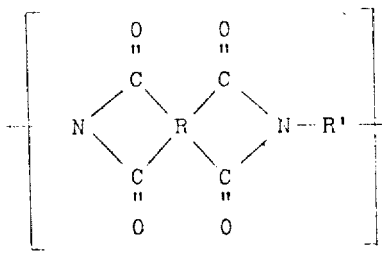

wherein R is a tetravalent radical containing at least one six-carbon atom ring characterized by benzenoid unsaturation and wherein the four carbonyl groups of said recurring structural unit are attached to separate carbon atoms in pairs with the carbonyl groups of each pair being attached to adjacent carbon atoms in said R radical; and wherein R' is a divalent aromatic radical, and a solid particulate polymer of formaldehyde. In another preferred embodiment, the composition of the invention comprises a coalescible polyimide powder, said polyimide having the recurring structural formula described immediately hereinabove, and a solid particulate polymer of unstabilized polyoxymethylene.

According to the present invention, there is further provided a method of manufacture for fabricating porous polyimide shaped articles such as sleeve bearings or journal bearings which comprises pressing a preform by subjecting a composition of a coalescible polyimide powder and a solid particulate polymer of formaldehyde to a forming pressure of at least about 10,000 psi, and heating said preform to a temperature above about 300°C. to sinter said preform and provide a porous polyimide shaped article having interconnecting pores. In a preferred embodiment, the method of the invention comprises pressing a preform by subjecting a composition of a coalescible polyimide powder, said polyimide having the recurring structural unit:

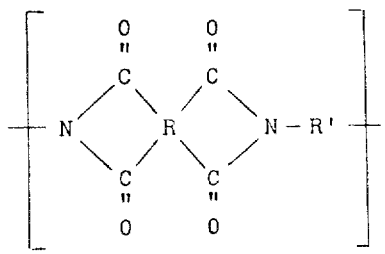

wherein R is a tetravalent radical containing at least one six-carbon atom ring characterized by benzenoid unsaturation and wherein the four carbonyl groups of said recurring structural unit are attached to separate carbon atoms in pairs with the carbonyl groups of each pair being attached to adjacent carbon atoms in said R radical; and wherein R' is a divalent aromatic radical, and a solid particulate polymer of formaldehyde to a forming pressure of at least about 10,000 psi, and heating said preform to a temperature above about 300°C. to sinter said preform and provide a porous polyimide shaped article having interconnecting pores. In another preferred embodiment, the method of the invention comprises pressing a preform by subjecting a composition of a coalescible polyimide powder, said polyimide having the recurring structural unit described immediately hereinabove, and a solid particulate polymer of unstabilized polyoxymethylene to a forming pressure of at least about 10,000 psi, and heating said preform to a temperature above about 300°C., to sinter said preform and provide a porous polyimide shaped article having interconnecting pores.

DETAILED DESCRIPTION

The nature and advantages of the composition and method of the present invention will be more clearly understood from the following more detailed description thereof.

The composition of the present invention comprises at least two essential components, namely, a coalescible polyimide powder and a solid particulate polymer of formaldehyde. The polyimide polymeric material of the composition of the invention is characterized by the following recurring structural unit:

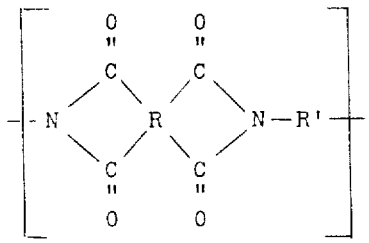

wherein R is a tetravalent aromatic radical containing at least one ring of six carbon atoms characterized by benzenoid unsaturation, the four carbonyl groups of said recurring structural unit being attached to separate carbon atoms in pairs with the carbonyl groups of each pair being attached to adjacent carbon atoms in said R radical; and wherein R' is a divalent aromatic radical.

The polyimides are prepared by reacting at least one organic diamine having the structural formula:

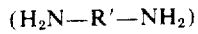

wherein R' is as above defined and the two amino groups of said diamine are each attached to separate carbon atoms of said aromatic radical, with at least one tetracarboxylic acid dianhydride having the structural formula:

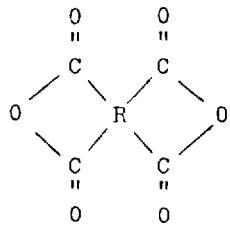

wherein R is as above defined, in an organic solvent for at least one of the reactants, the solvent being inert to the reactants, preferably under anhydrous conditions, for a time and at a temperature below 175°C. sufficient to form a polyamide acid which is then converted by suitable means such as by heating to the above polyimide. Suitable polyimides for the method of the present invention are those based upon, for example, pyromellitic dianhydride and 4,4'-oxydianiline or based upon 3,3',4,4'-benzophenone tetracarboxylic dianhydride and 4,4'-oxydianiline or metaphenylenediamine. Suitable polyimides and powders thereof are more extensively described in U.S. Pat. Nos. 3,179,631 and 3,249,588. The foregoing polyimides may be utilized either singly or in mixtures thereof in the composition of this invention. The polyimide powder comprises at least 50% by weight of the composition of the invention when the composition consists of unfilled polyimide and a polymer of formaldehyde.

The other essential component of the composition of the invention is a solid particulate polymer of formaldehyde. Polymers of formaldehyde are more generally denominated polyacetals and include or are characterized by a linear polymer chain containing recurring —(CH$_2$O)— units or groups. The preferred polymer of formaldehyde in the composition of the invention is polyoxymethylene which has not been stabilized against thermal degradation as, for example, by end-capping the ends of the linear polymer chain with stabilizing end-groups. Thus, the preferred polymer of formaldehyde is paraformaldehyde, which is a lower molecular weight linear polymer available commercially as a fine powder. Polymers of formaldehyde are described more fully in U.S. Pat. No. 2,768,994 and are sold under the trademark Delrin by E. I. du Pont de Nemours and Company, Inc. Delrin polymers usually have been stabilized against thermal degradation but these polymers may be utilized as is illustrated in Example 2 herebelow. Suitable polymers of formaldehyde also include, for example, trioxane. The polymer of formaldehyde comprises up to about 50% by weight of the composition of the invention.

The composition of the invention may include, in addition to the coalescible polyimide powder and the solid particulate polymer of formaldehyde, other additives and materials adapted to be fabricated into shaped articles. Suitable additives and materials for combining with the coalescible polyimide powder and the polymer of formaldehyde include finely divided particulate materials such as other particulate polymers, e.g., polytetrafluoroethylene, and finely divided metals, metal oxides, minerals, carbon, graphite, asbestos, glass, mica, vermiculite, kaolin and abrasive particles such as silicon carbide, boron nitride and diamonds, also including mixtures of any of the foregoing materials. Additive materials may comprise up to about 70% by weight, based upon the total weight of the polyimide and the additive materials in the composition of the invention.

The composition of the invention may be formed into porous polyimide shaped articles by a direct-forming and free-sintering method which comprises subjecting the composition of a coalescible polyimide powder and a solid particulate polymer of formaldehyde to a compressive force of at least about 10,000 psi, preferably 100,000 psi, at a temperature preferably about room temperature (25°C.) thereby to provide a preform and thereafter heating the preform to a temperature above about 300°C. to sinter said preform and provide a porous polyimide shaped article having interconnecting pores. The heating step in the method of the invention both coalesces the polyimide powder in the preform and thermally degrades and depolymerizes the solid particulate polymer of formaldehyde which is evolved in gaseous form thereby leaving voids in the preform to provide a porous polyimide shaped article having interconnecting pores. Thus, the solid particulate polymer of formaldehyde in the composition of the invention acts or functions as a fugitive or transient filler which is evolved during the initial heating step of the method of the invention.

The heating sequence of the method of the invention may preferably be conducted in a step-wise manner as by varying the heating rate of the preform in and through more than one heating cycle. Specifically, it is preferable to heat the preform at a substantially uniform rate from room temperature to about 80°C. by raising the temperature of the preform in increments of 5°C. at 30 minute intervals, and thereafter to continue heating the preform to a temperature of about 150°C. at an incremental heating rate of 7°C. per hour, and thereafter to continue heating the preform at a faster rate, e.g., 1½°C. per minute, to a temperature of about 400°C. and then to maintain the preform at the latter temperature for a suitable period of time such as, for example, 3 hours. The foregoing heating cyle precludes inadvertent and/or undesired cracking of the preform structure. To illustrate, the solid particulate polymer of formaldehyde decomposes as by depolymerization to gaseous formaldehyde during the initial heating sequence of the method, and release or escape of the formaldehyde gas without containment of the gaseous formaldehyde in the preform is desirable since, othewise, formaldehyde gas trapped within the preform may develop sufficient pressure during the heating sequence to crack the preform. For this reason, the concentration of the solid particulate polymer of formaldehyde in the composition and preform of the invention should be sufficient to provide interconnected pores in the preform which provide suitable pathways for allowing release of the gaseous formaldehyde. The concentration of the solid particulate polymer of formaldehyde in the composition and preform of the invention should be at least about 5% by weight, based upon the total weight of the composition or preform, and preferably between about 12% and 30% by weight. Thereafter, the preform is preferably heated to a temperature above about 300°C. to coalesce the the polyimide particles and obtain a porous polyimide shaped article. The foregoing heating sequence has been found to be satisfactory for preparing porous polyimide cylinders having a diameter of 1⅛ inches and a height of 1¼ inches.

A salient feature of the present invention is that the solid particulate polymer of formaldehyde pyrolyses cleanly to formaldehyde gas and is evolved from the preform without leaving a formaldehyde residue therein and without effecting a change in the density of the polyimide phase of the preform which coalesces simultaneously to provide a porous polyimide shaped article. Thus, the pore structure of the polyimide shaped article corresponds substantially identically to the particle size and distribution of the solid particulate polymer of formaldehyde present originally in the preform. The pore size of the porous polyimide shaped article may be regulated as desired by utilizing solid particulate polymers of formaldehyde having varying and/or specific particle size. For example, particulate polymers of formaldehyde of uniform particle size may be used, or mixtures of particulate polymers of formaldehyde of different particle size may be utilized to provide the porous polyimide shaped articles. Paraformaldehyde in the form of commercially available powder consists of solid hard particles having a range of particle sizes with a typical average size of about 20$\mu$ as determined using a commercial micromerograph. This analytical method involves a sedimentation process using a gas as the sedimentation fluid. The particles settle down the sedimentation tube onto a balance pan and a graph of weight versus time is obtained. Through proper calibration, a continuous particle size distribution curve is obtained for particles in the 1 to 250$\mu$ size range. Reference: T. Allan, "Particle Size Measurement", Chapman and Hall, Ltd., London 1968, pg. 99.

The particles of paraformaldehyde are hard and nonporous. Thus, the pores left in the porous polyimide moldings have the size and distribution of the original paraformaldehyde particles in the preforms. The size and distribution of pores and pore volume are thus subject to deliberate control. If larger or smaller pores are desired, the paraformaldehyde powder may be screened to obtain a larger or smaller particle size fraction. Alternately, the smaller particles may be removed by gas elutriation. When larger particles are desired than can be obtained from the paraformaldehyde powder, flake paraformaldehyde may be ground and screened to the desired size. Pore volume is controlled simply by the quantity of paraformaldehyde used in the initial composition.

The above-described method of the invention may be used to make standard shapes of porous polyimide articles such as rods, tubes and discs which may subsequently be machined into a variety of articles, or to form directly such articles as bushings, electric insulators, gears and bearings. An important utility of porous polyimide shaped articles includes use as oil-filled bearings which will be illustrated in some of the examples herebelow.

The principal and practice of the present invention will now be illustrated by the following examples which are exemplary only and it is not intended that the invention be limited thereto since modifications in technique and operation will be apparent to anyone skilled in the art. All parts and percentages specified herein are by weight unless otherwise indicated.

The test specimens prepared in the following Examples were evaluated in accordance with the following procedures:

OIL IMPREGNATION — The porous polyimide specimens were impregnated with oil (as specified in the Examples) by submerging the porous specimen below the surface of the oil in a closed container at a temperature of a nominally 150°C. and an absolute pressure of about 0.5 mm. Hg. The residence time under vacuum was continued until all evidence of air bubbles emerging from the specimen ceased. Typically, the time required was about 4 hours. At this time, the vacuum was broken, the heat to the oil was turned off, and atmospheric pressure was established over the oil via a nitrogen blanket. After a time interval of nominally 16 hours, the specimen was removed from the oil, allowed to drain, and was then wiped clean of all traces of excess surface oil. The average weight gain of the test specimen resulting from oil impregnation was used to calculate the percent of the total porosity of the specimen that had been filled with oil.

WEAR TEST — The wear characteristics and the coefficient of friction of the porous polyimides were evaluated by machining standard thrust bearing test specimens using the wear testing apparatus and procedure described by R. B. Lewis in "Predicting the Wear of Sliding Plastic Surfaces", Mech. Eng., 86, 32 (1964). The standard thrust bearing test specimen each consisted of a cylindrical disc having (1) a cylindrical body member of a diameter of 0.980 ± 0.002 inch and a height (thickness) of 0.10 inch, and (2) a raised annular ring on one end of the cylindrical body member (the base of the raised annular ring was integral with the cylindrical body member) having an outer diameter equal to the diameter of the cylindrical body member and an internal diameter of 0.840 ± 0.002 inch, and a height of 0.10 inch (measured from the end surface of the body member). In this test, the wear test specimen was secured in a self-aligning mount underneath a revolving steel disc. The steel disc was loaded to a force of 50 lbs. which produced a 250 psi loading on the 0.20 in.$^2$ running surface of the wear test specimen. The angular velocity of the revolving steel disc was controlled to provide 100 ft./min. velocity on the running surface of the wear test specimen, thus providing a PV (pressure × velocity) of 25,000. The wear test was conducted for the indicated time periods, afte which an average coefficient of friction and the wear factor were calculated from the change in thickness of the test specimen. The self-aligning mount for the test specimen was supported in a nearly frictionless bearing assembly and the mount was provided with a lower arm extending horizontally outwardly therefrom adapted to contact a mechanical stop member for preventing rotation of the mount and the test specimen secured therein. The coefficient of friction, $\mu$, was calculated from the equation:

$$\mu = FX/NR$$

wherein $F$ is the force (lbs.) applied at a distance on the lever arm $X$ (in.) from the center of the test specimen sufficient to move the lever arm from the stop member, and $N$ is the force (lbs.) normal to the test specimen, and $R$ is the average radius (in.) of the test specimen obtained by dividing the sum of the outer diameter and the inner diameter of the raised annular ring of the test specimen by four.

EXAMPLE 1

The blends listed below of poly-N,N'-(4,4'-oxydiphenylene) pyromellitimide resin and paraformaldehyde powder were prepared by dry blending in a jar on rolls for about 5 minutes followed by dry blending in a Osterizer blender for approximately 1 minute.

|   | Resin (g.) | Paraformaldehyde (g.) |
|---|---|---|
| A | 45 | 5 |
| B | 40 | 10 |
| C | 35 | 15 |
| D | 30 | 20 |

The resulting homogeneous compositions were used to prepare disc performs of 1 inch diameter by 0.25 inch thickness by compaction in a cylindrical mold at room temperature and at a pressure of 100,000 psi. The preforms were then thermally cycled in a nitrogen atmosphere by slowly preheating the preforms to 80°C. and thereafter heating the specimens to 150°C. by increasing the temperature continuously at a rate of 7°C. per hour (this stage of the heating cycle effects removal of the paraformaldehyde filler), and thereafter heating the specimens to 400°C. by increasing the temperature continuously at a rate of 1.5°C. per minute, and maintaining the specimens at 400°C. for 3 hours (this stage of the heating cycle effects sintering of the specimens). The void content of each disc specimen was determined from the actual density of the disc, as calculated from its dimensions and weight, and the fully compacted density of 1.43 g./cc. The disc specimens were impregnated with Sunvis 31 hydrocarbon oil as described above. From the weight of oil absorbed and its density (0.86 g./cc.) the volume of oil absorbed was calculated and used to determine the percent voids filled. The results are summarized in the table below.

|   | Diameter (in) | Height (in) | Calculated[a] Volume (cc) | Weight (g) | Calculated Density (g/cc) | % Voids[b] | Void Volume (cc) | Weight Oil Uptake (g) | %[c] Voids Filled |
|---|---|---|---|---|---|---|---|---|---|
| A | 0.9772 | 0.2213 | 2.7206 | 3.1860 | 1.171 | 18.1 | 0.4925 | 0.0869 | 20.5 |
| B | 0.9760 | 0.2313 | 2.8365 | 3.0496 | 1.075 | 24.8 | 0.7035 | 0.4949 | 81.8 |
| C | 0.9758 | 0.2388 | 2.9285 | 2.8222 | 0.964 | 32.6 | 0.9544 | 0.7296 | 88.9 |
| D | 0.9750 | 0.2448 | 2.9760 | 2.5157 | 0.840 | 41.3 | 1.2367 | 0.9735 | 91.5 |

[a] $V = \pi r^2 h$
[b] % Voids = (Full Density − Calculated Density/Full Density) × 100
[c] % Voids Filled = 100 − (Void Volume − Volume Oil Uptake/Void Volume) × 100

EXAMPLE 2

60 grams of solid particulate end-capped polyformaldehyde (Delrin 500) were added to 900 milliliters of N,N'-dimethylformamide in a round bottom flask of two liter capacity having a stirrer, reflux condenser and a gas inlet tube connected thereto. A Primol D bubbler was connected to the top of the condenser and nitrogen was passed through the system for 45 minutes to purge the air therein. The stirred slurry was then heated using a heating mantle until the boiling point of the solvent was reached and the polymer dissolved. The heating mantle was turned off and the solution was stirred during cooling. A fluffy polymer precipitated to produce a thick slurry requiring an increase in the RPM of the stirrer. The polymer was recovered by filtration using a medium frit Buchner funnel, reslurrying with acetone, filtration, and drying overnight in a vacuum oven with nitrogen bleed at 80°C.

A blend of 17.5 grams poly-N,N'-(4,4'-oxydiphenylene) pyromellitimide and 7.5 grams fluffy polyformaldehyde obtained by precipitation as above described was prepared by mixing dry in an Osterizer blender for 1 minute at high speed followed by wet mixing for 10 minutes with enough acetone (about 65–70 mls.) to make a smooth mix. The mixture was filtered and dried in a vacuum oven with nitrogen bleed at 90°C. for 4 hours. The mixture containing 30% by weight polyformaldehyde was compacted in a one-half inch diameter cylindrical mold at a pressure of 100,000 psi to produce disc preforms. The preforms were heated in a nitrogen atmosphere at a rate of about 1½°C./min. to 150°C., then at a slow rate to 200°C. over a 640 minute period and finally at 200°C. for 3 hours. The average weight loss of the preforms was 30.48%. The porous preforms were then free sintered by heating in a nitrogen atmosphere at a rate of 1½°C./min. to 400°C. and then maintained at this temperature for 3 hours. The porous discs were removed from the oven and they had lost an average of 32.43% of the original weight, corresponding to an approximate void volume of 32%.

EXAMPLE 3

A blend was prepared by dry mixing 40 grams of the polyimide resin of Example 2 and 10 grams of paraformaldehyde powder in a blender device operated at high shear for 1 minute. Disc preforms one-half inch in diameter were prepared by compacting samples of the mixture at 100,000 psi and the preforms were subjected to a thermal cycle consisting of a gradual heating to 150°C. in an atmosphere of nitrogen over a period of 13–14 hours followed by heating at a rate of 1½°C./min. to 400°C. and then maintaining the preform at 400°C. for 3 hours. The average weight loss of the preforms was 21.14%, corresponding to an approximate void volume of 21%.

EXAMPLE 4

Example 3 was repeated except that the preforms were compacted using a pressure of 50,000 psi. During the overall thermal cycle, an average total weight loss of 20.85% occurred.

EXAMPLE 5

A mixture of 4.60 grams of the polyimide resin of Example 2 and 0.40 gram paraformaldehyde powder was dry blended in a 2 oz. wide mouth jar on rotating rolls for 2 hours. The blend was preformed into one-half inch discs using a pressure of 100,000 psi. The discs were converted to porous moldings using the thermal cycle of Example 3. The average overall weight loss was 9.76%.

EXAMPLE 6

A blend was prepared by dry mixing in a blender device 38 grams of the polyimide resin of Example 2 and 12 grams of fluffy polyformaldehyde precipitated from a 6.6% by weight solution. Porous discs were prepared as in Example 3 with an overall weight loss of about 24.2%. A porous cylinder one-half inch in diameter and 1¼ inch long was also made. Weight loss was 24.2%. The dimensions of the cylinder were measured and the density was calculated to show a void volume of 29%. Porous tensile bars made using the same fabrication technique had a tensile strength of 3400 psi and elongation of 2.4% as measured using the procedure of ASTM-E8.

EXAMPLE 7

Fluffy polyformaldehyde precipitated from a 6.6% by weight solution was screened through a 140 mesh sieve (U.S. Bureau of Standards) with openings of 105$\mu$. A blend was then prepared from 7.5 grams of the polyformaldehyde which passed through the seive, 7.5 grams of paraformaldehyde powder and 40 grams of the polyimide resin of Example 2 by dry blending in a mixer for 20 seconds. A total of 10 discs approximately one-half inch in diameter and 0.2 inch thick were preformed at 100,000 psi pressure. After a thermal cycle of 16 hours in a vacuum oven with nitrogen bleed at 86°C. and 20 hours at 15020C., the average weight loss was 13.1%. One disc had small cracks on the edge. The preforms were sintered by heating at a rate of 1½°C. per minute in a nitrogen atmosphere to 400°C. and maintaining this temperature for 3 hours. The edge crack noted previously did not enlarge and no additional cracking was observed. The average weight loss for the entire cycle was 27.25%. The dimensions of the discs were measured and the average density was calculated to be 1.016 grams/cc. corresponding to a void volume of 29%.

EXAMPLE 8

A blend was prepared by dry mixing in a blender 40.0 grams of the polyimide resin of Example 2 and 10.0 grams of the fluffy polyformaldehyde of Example 7. The blend was used to prepare 10 preform discs of one-half inch diameter by compaction at 100,000 psi. The thermal cycle of slow heating to 200°C. (19.2% average weight loss) followed by free sintering at 400°C. as in Example 7 yielded porous discs having an average overall weight loss of 20.31%. The dimensions of the discs were measured and the average density was calculated to be 1.086 grams/cc., corresponding to a void volume of 24.1%.

EXAMPLE 9

A blend was prepared by dry mixing in a blender 43.0 grams of the polyimide resin of Example 2 and 7.0 grams of fluffy polyformaldehyde which was precipitated from a 6.6% solution by weight and screened through a 200 mesh sieve (U.S. Standard) having 74$\mu$ openings. Preform discs one-half inch in diameter were compacted at 100,000 psi and put through the thermal cycle of Example 2. The calculated void volume of the porous discs, based on dimensions and weights was 18%.

EXAMPLE 10

A blend was prepared by dry mixing in a blender for 30 seconds 20.0 grams of poly-N,N'-(4,4'-oxydiphenylene) pyromellitimide containing 20.0% by weight of graphite and 5.0 grams of the fluffy polyformaldehyde used in Example 9. Discs one-half inch in diameter were preformed using a pressure of 100,000 psi and heated using the thermal cycle of Example 2. Based on calculations of volume using dimensions of the porous discs, void volumes of about 25.1% were calculated. Discs were impregnated with a perfluorinated polyether oil, "Krytox" 143 AD (specific gravity of 1.91), by submerging the discs below the surface of the oil while maintaining a temperature of 150°C. and a pressure within the container of about 0.5 mm. Hg absolute. When bubbles ceased emerging from the disc, after about 4 hours, the vaccum was broken with nitrogen and atmospheric pressure was established over the oil surface. After about 16 hours, the discs were removed from the oil, allowed to drain and were wiped clean of traces of excess surface oil. The weight gain resulting from the impregnation indicated 80.4% of the voids present had been filled with oil.

EXAMPLE 11

A blend of 80 grams of poly-N,N'-(4,4'-oxydiphenylene) pyromellitimide resin powder and 20 grams of uncapped polyformaldehyde powder was prepared by dry blending for 30 seconds at low speed in a blender. The resulting homogeneous composition was used to prepare disc preforms of 1 inch diameter by 0.25 inch thickness by compaction in a cylindrical mold at room temperature and at a pressure of 100,000 psi. The disc preforms were then converted into porous moldings by a thermal treatment of 16 hours at 80°C. under a vacuum of 25 inches Hg to remove the polyformaldehyde filler followed by heating at 1½°C./min. to 400°C. which was maintained for 3 hours. The density of the resulting moldings showed 25.5 percent porosity. A porous molding was subsequently machined to the dimensions of a standard thrust washer wear specimen which was then impregnated with "Krytox" AD 143 oil; 81.8% of the available porosity was filled with the oil. The oil-filled specimen was subjected to the wear test for 775 hours; the average coefficient of friction of the test specimen was 0.174 and the wear factor was 2.73 × $10^{-10}$ (in.$^3$-min./ft.-lb.-hr.).

EXAMPLE 12

Example 11 was repeated except paraformaldehyde powder was used in place of uncapped polyformaldehyde to generate porosity. The wear test specimen had a porosity of 22.7% and 24.6% of the available pores were filled with "Krytox" AD 143 oil during impregnation. After 930 hours of test time the specimen showed an average coefficient of friction of 0.171 and an average wear factor of 1.20 × $10^{-10}$ (in.$^3$-min./ft.-lb.-hr.).

EXAMPLE 13

Example 11 was repeated except that relatively large particles of uncapped polyformaldehyde (100–200μ) were employed to generate porosity. The wear test specimen showed a porosity level of 23.8% and 7.2% of the available porosity was oil-filled during impregnation with "Krytox" AD 143 oil. After 320 hours of testing, the wear specimen showed an average coefficient of friction of 0.185 and an average wear factor of 65.4 × $10^{-10}$ (in.$^3$-min./ft.-lb.-hr.).

EXAMPLE 14

Example 12 was repeated except that the polyimide resin used also contained graphite and polytetrafluoroethylene at nominal levels of 13% and 10% by weight, respectively. The wear test specimen had a porosity of 27.9% and 90.8% of the available porosity was oil-filled during impregnation with "Krytox" AD 143 oil. After 5820 hours of run time, the specimen showed an average coefficient of friction of 0.11 and an average wear factor of 0.2 × $10^{-10}$ (in.$^3$-min./ft.-lb.-hr.).

EXAMPLE 15

Example 14 was repeated with a specimen having a porosity of 28.3% and 89.3% of the available porosity of the specimen was filled with Sunvis 31, a hydrocarbon oil. After 4248 hours of wear testing, the specimen showed an average coefficient of friction of 0.05 and an average wear factor of 0.1 × $10^{-10}$ (in.$^3$-min./ft.-lb.-hr.).

EXAMPLE 16

Example 12 was repeated except that 30% by weight of paraformaldehyde was used instead of 20%. The wear test specimen had a porosity of 31.5% and 86.1% of the available porosity was oil-filled during impregnation with "Krytox" AD 143 oil. After 774 hours of operation the specimen showed an average coefficient of friction of 0.198 and an average wear factor of 3.76 × $10^{-10}$ (in.$^3$-min./ft.-lb.-hr.).

An oil impregnated porous bronze thrust washer (machined to size from bronze, oil-filled washer available commercially from Boston Gear Division, North American Rockwell, Quincy, Mass.) wear test specimen was evaluated under identical conditions of testing as described for Examples 11–16. After 142 hours of operation this specimen showed an average coefficient of friction of 0.054 and an average wear factor of 0.5 × $10^{-10}$ (in.$^3$-min./ft.-lb.-hr.). Several hours later the test specimen failed catastrophically. Four other oil impregnated porous bronze bearings were tested under the same conditions described before and all failed catastrophically within 24 to 250 hours of testing.

EXAMPLE 17

The procedure of Example 10 was repeated using 20.0 grams of the polyimide resin obtained from metaphenylenediamine and 3,3',4,4'-benzophenone tetracarboxylic dianhydride and 5.0 grams of the fluffy polyformaldehyde used in Example 9. The porous discs contained void volumes of about 21.6% with essentially all of the voids being filled by oil during impregnation.

EXAMPLE 18

The procedure of Example 10 was repeated using 20.0 grams of the polyimide resin obtained from 4,4'-oxydianiline and 3,3',4,4'-benzophenone tetracarboxylic dianhydride and 5.0 grams of the fluffy polyformaldehyde used in Example 9. The porous discs contained void volumes of about 23.8% with about 87.2% of the voids being filled by oil during impregnation.

EXAMPLE 19

Example 18 was repeated using a low molecular weight version of the same polyimide resin. Void volume of about 26.4% was measured with about 87.4% being filled by oil during impregnation.

EXAMPLE 20

50 grams of granular trioxane was cut in a laboratory blender at high speed for 2 minutes to reduce particle size to less than 100 microns. Ten grams of the cut trioxane was then blended with 40 grams of poly N,N'-(4,4'-oxydiphenylene pyromellitimide in the same blender for 1 minute. The resulting composition was compacted in a cylindrical mold at 30,000 psi and at 50,000 psi to produce disc preforms of 1⅛ inch diameter. Tensile bar preforms were compacted at 100,000 psi. Much of the trioxane volatilized on standing at room temperature. The preforms were then given a thermal treatment in the usual way to produce porous discs and tensile bars. Measurement of the discs compacted at 50,000 psi showed 16.3% voids present. These voids were 75.5% filled by oil using the usual method. Tensile strength of the tensile bar preforms was found to be 3900 psi, and elongation of the tensile bar preforms was 2.3%.

EXAMPLE 21

An uncapped polyformaldehyde of granular form was ground in a laboratory pulverizing mill and screened to produce a fraction passing a No. 60 sieve and being retained on a No. 115 seive (Tyler Sieve Seres), corresponding to particles having a particle size in the range of 124–246μ. A blend of 74.7g of this polyformaldehyde with 86.2g of polyN,N'-(4,4'-oxydipenylene) pyromellitimide containing nominally 40% by weight of graphite was prepared by dry blending on rotating rolls. The polyformaldehyde fugitive filler was present at a 50% by volume level. A disc 4 inches in diameter and one-half inch thick was preformed by compaction at 50,000 psi and put through the following thermal cycle (in a nitrogen atmosphere):
a. rapid heat-up to 150°C.;
b. slow heat-up to 175°C. at a rate of 5°C./hr.;
c. isothermal heating at 175°C. for 16 hours;
d. rapid heat-up to 200°C.;
e. isothermal heating at 200°C. for 30 minutes;
f. cooling to room temperature;
g. heating to 400°C. at a rate of 1½°C. per minute;
h. isothermal heating at 400°C. for 3 hours; and
i. cooling to room temperature.
A porous machinable disc was obtained.

What is claimed is:

1. A composition comprising a coalescible polyimide powder and 5 to 50% by weight, based upon the total weight of said composition, of a solid, particulate homopolymer of formaldehyde, wherein said polyimide is characterized by the following recurring structural unit:

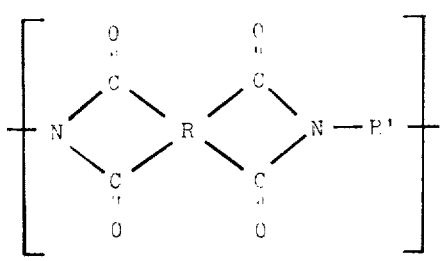

wherein R is a tetravalent radical containing at least one six-carbon atom ring characterized by benzenoid unsaturation and wherein the four carbonyl groups of said recurring structural unit are attached to separate carbon atoms in pairs with the carbonyl groups of each pair being attached to adjacent carbon atoms in said R radical; and wherein R' is a divalent aromatic radical.

2. The composition of claim 1 wherein said solid particulate polymer of formaldehyde is unstabilized polyoxymethylene.

3. The composition of claim 1 wherein said polymer of formaldehyde is paraformaldehyde.

4. The article of claim 1 wherein said polyimide is poly-N,N'-(4,4'-oxydiphenylene) pyromellitimide.

5. The article of claim 4 having present therein graphite.

6. The article of claim 4 having present therein polytetrafluoroethylene.

7. The article of claim 5 having present therein polytetrafluoroethylene.

8. The article of claim 1 wherein said polyimide is a polyimide of 3,3',4,4'-benzophenone tetracarboxylic dianhydride and an organic diamine having a divalent aromatic radical.

9. The article of claim 8 having present therein graphite.

10. The article of claim 8 having present therein polytetrafluoroethylene.

11. The article of claim 9 having present therein polytetrafluoroethylene.

12. The article of claim 9 wherein said organic diamine is methaphenylenediamine.

13. The article of claim 9 wherein said organic diamine is 4,4'-oxydianiline.

14. The article of claim 10 wherein said organic diamine is metaphenylenediamine.

15. The article of claim 10 wherein said organic diamine is 4,4'-oxydianiline.

* * * * *